Figure 1:
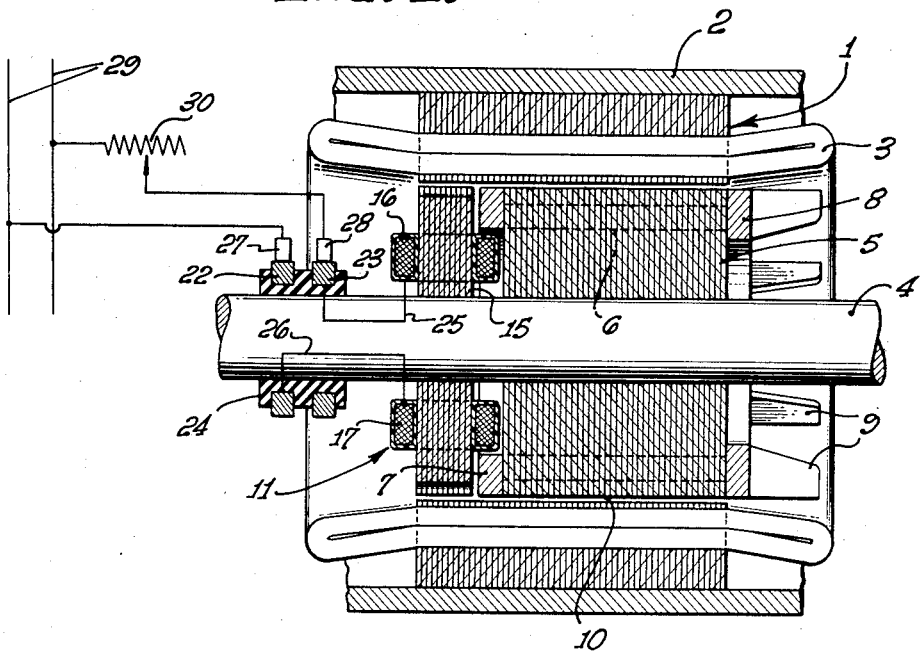

Nov. 10, 1959  F. O. LUENBERGER  2,912,631
DYNAMOELECTRIC MACHINERY HAVING A SUPPLEMENTAL
SATURABLE CORE ROTOR
Filed June 3, 1957

FREDERICK O. LUENBERGER,
INVENTOR.

BY Flam and Flam
ATTORNEYS.

United States Patent Office 2,912,631
Patented Nov. 10, 1959

2,912,631

DYNAMOELECTRIC MACHINERY HAVING A SUPPLEMENTAL SATURABLE CORE ROTOR

Frederick O. Luenberger, Los Angeles, Calif., assignor to U.S. Electrical Motors, Inc., Los Angeles, Calif., a corporation of California Application June 3, 1957, Serial No. 663,134

9 Claims. (Cl. 318—232)

This invention relates to dynamo-electric machinery, and particularly to induction motors.

The standard type of induction motor is provided either with a squirrel cage rotor or a wound rotor. The most common form is the squirrel cage type, in which simplicity of structure is an important factor. In such forms, the characteristics of the motor, such as starting torque and starting current, are incapable of adjustment. Often it is advantageous to reduce the starting torque to comply with load requirements.

It is one of the objects of this invention to provide a simple and effective means for adjusting the starting torque of induction motors, and especially those using squirrel cage rotors.

The stator, when energized, sets up a magnetic flux which extends across the air gap and through at least a part of the rotor core. This flux induces currents in the squirrel cage rotor winding, and in a well-known manner, a torque is produced on the rotor by the interaction of the magnetic flux and rotor current flow.

The present invention contemplates the use of some means for controlling the effective magnetic flux in the rotor core, so as thereby to control the torque exerted upon the rotor. It is accordingly another object of this invention to control the torque by adjusting the flux density through the rotor core.

In order to provide a simple flux adjustment for this purpose, use is made of a supplemental core, paralleling the rotor core, and provided with a direct current winding. This core carries no motor windings and merely shunts the main core. The permeability of the supplemental core can be adjusted by adjusting the current in the direct current winding. The greater the flow of current, the greater is the direct current flux and the less the permeability. At saturation, the permeability approaches that of air. Accordingly, when it is desired to increase the torque, the direct current is increased, for then the flux from the stator will flow mainly through the rotor. On the contrary, if the direct current is reduced, the permeability of the supplemental core is increased, and a larger portion of the flux from the stator flows through the supplemental core, reducing the torque.

Therefore, it is another object of this invention to provide a saturable supplemental shunting core for the main rotor core in such manner as to permit an adjustment of the torque exerted on the rotor.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Figure 2:
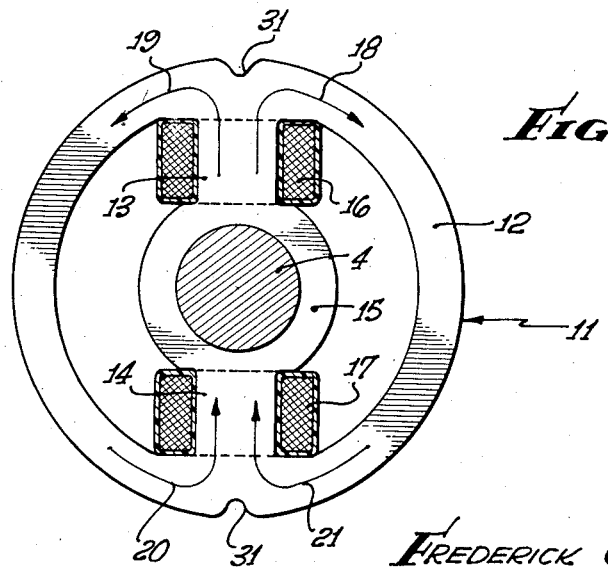

Referring to the drawings:

Figure 1 is a fractional longitudinal sectional view, mainly diagrammatic of an induction motor incorporating the invention, the circuit for the winding magnetizing the supplemental rotor core member being also indicated; and Fig. 2 is a diagram illustrating the configuration of the laminations out of which the supplemental core is constructed.

In the present instance, the induction motor structure illustrated is one adapted for four-pole operation. The stator laminations 1 are shown as appropriately accommodated in a frame 2. The stator laminations carry a stator winding or primary winding 3. Since the stator structure may be of any desired form, further description thereof is unnecessary.

A shaft 4 supports the main rotor core 5, made up of laminations and provided with conductors 6. Only a few of these conductors are indicated in dotted lines. They extend through slots provided in the core 5 adjacent the periphery thereof. These conductors are short-circuited between end rings 7 and 8 in a manner now well understood. The end ring 8 may be provided with integral fan blades 9 serving to ventilate the motor.

The axial length of the rotor core 5 is substantially less than the axial length of the stator core 1. The inner periphery of the stator core 1 and the outer periphery of the rotor core 3 define a narrow air gap 10.

When starting an induction motor of this type, usually a heavy alternating current is induced in the winding 6 and there is an attendant heavy starting torque. The torque is caused by the interaction of the magnetic flux (passing from the stator core 1 through the air gap 10 into the rotor core 5 and thence across the air gap 10 back to the stator core 1) with the conductor bars 6. These phenomena are now well understood.

The present invention contemplates a way of adjusting the intensity of the magnetic flux so that the torque imposed on the rotor structure can be adjusted. For this purpose, a supplemental core 11 is provided, made up of laminations, the form of which is most clearly illustrated in Fig. 2. These laminations preferably have a diameter corresponding to the diameter of the rotor core 5, so that their external peripheries are of about the same size. The laminations are appropriately riveted together or otherwise clamped.

The supplemental core 11 abuts the end rings 7 quite closely. Each lamination includes an outer peripheral ring member 12 joined by diametrically opposite radial arms 13 and 14, and a central hub portion 15 through which the shaft 4 extends. Shallow recesses 31 in the periphery are arranged symmetrically with respect to the arms 13, 14 to assist in defining the magnetic paths through the peripheral portion 12 and arms 13, 14.

Direct current energizing coils 16 and 17 are provided respectively on the arms 13 and 14. They are so arranged as to provide a direct current flux, having for example, the direction indicated by arrows 18, 19, 20 and 21.

When the coils 16 and 17 are not energized, a part of the flux between the primary winding 3 and rotor winding 6 is shunted through the peripheral portion 12 of the stack of laminations; and accordingly the torque is reduced. The permeability of the laminations making up the supplemental core 11 being quite high, the reduction in torque is quite pronounced. The cross-section of the peripheral portion 12 of the supplemental core 11 is so chosen as adequately to accommodate the flow of flux without saturation between the stator core 1 and the supplemental core 11.

As the energization of the coils 16 and 17 is increased, the permeability of the supplemental core is correspondingly reduced, until this permeability approaches unity. Under such circumstances, substantially all of the flux produced in the core 1 proceeds through the main rotor core 5, and the torque produced by the motor is a maximum.

In order to conduct direct current for energizing the coils 16 and 17, use may be made of a pair of collector rings 22 and 23 mounted upon an insulation support 24 carried by the shaft 4. These collector rings 22 and 23 carry the connections 25 and 26 for the coils 16 and 17. Brushes 27 and 28 lead to a direct current source provided by the mains 29. A variable resistance 30 can be provided in one of the connections so as to make it possible to adjust the permeability of the supplemental core structure 11 and thereby to adjust the effective torque exerted upon the rotor structure.

The inventor claims:

1. In an induction motor: a stator having a flux inducing winding; a main rotor core; a winding on the core; said winding being affected by the magnetic flux passing from the stator into and out of the core; a saturable supplemental core for shunting some of said flux; and a coil cooperating with the supplemental core for inducing a supplemental direct current flux within the supplemental core.

2. In an induction motor: a stator having a flux inducing winding; a main rotor core; a winding on the core; said winding being affected by the magnetic flux passing from the stator into and out of the core; a saturable supplemental core for shunting some of said flux; and means for adjusting the saturation of said supplemental core, including a direct current coil cooperating with said supplemental core.

3. In an induction motor having a stator, stator windings, a rotor core, and rotor windings, the main motor flux passing between the stator and the rotor core: the combination therewith of a saturable supplemental core for shunting some of the flux; and means for adjusting the saturation of said supplemental core, including a direct current coil cooperating with said supplemental core.

4. In a rotor structure for an induction motor: a shaft; a stack of rotor laminations carried by the shaft; a rotor winding carried by the stack; a supplemental stack of laminations out of cooperative relation to the rotor windings, said supplemental stack having a periphery corresponding to that of the rotor laminations; and means for adjusting the permeability of said supplemental stack, including a direct current coil cooperating with said supplemental core.

5. In a rotor structure for an induction motor: a shaft; a stack of rotor laminations carried by the shaft; a rotor winding carried by the stack; a supplemental stack of laminations carried by the shaft and out of cooperative relation to the rotor windings, said supplemental stack having a periphery corresponding to that of the rotor laminations; and a direct current winding carried by the supplemental stack.

6. In a rotor structure for an induction motor: a shaft; a stack of rotor laminations carried by the shaft; a rotor winding carried by the stack; a supplemental stack of laminations carried by the shaft and out of cooperative relation to the rotor windings, said supplemental stack having a periphery corresponding to that of the rotor laminations; a direct current winding carried by the supplemental stack; and means for passing a regulable current through said direct current winding.

7. In a rotor structure for an induction motor: a shaft; a stack of rotor laminations carried by the shaft; a rotor winding carried by the stack; a supplemental stack of laminations carried by the shaft and out of cooperative relation to the rotor windings, said supplemental stack having a periphery corresponding to that of the rotor laminations; said supplemental stack having an annular portion, and arms connecting within the annular portion; and a direct current winding on at least one of the arms.

8. In an induction motor structure: a first stack of rotor laminations; a rotor winding carried by the stack; a supplemental stack out of cooperative relation to the rotor winding and adjacent the said first stack; and a direct current winding carried by the supplemental stack.

9. In an induction motor structure: a first stack of rotor laminations; a rotor winding carried by the stack; a supplemental stack out of cooperative relation to the rotor winding and adjacent the said first stack; a direct current winding carried by the supplemental stack; and means for passing a regulable current through said direct current winding.

References Cited in the file of this patent

UNITED STATES PATENTS

| | | |
|---|---|---|
| 1,942,649 | Johnson | Jan. 9, 1934 |
| 2,748,334 | Miller | May 29, 1956 |